(12) United States Patent
Qiu

(10) Patent No.: US 10,371,785 B2
(45) Date of Patent: Aug. 6, 2019

(54) POLAR AXIS CALIBRATION SYSTEM, ELECTRONIC POLAR SCOPE, POLAR AXIS CALIBRATION CONTROL DEVICE, AND EQUATORIAL INSTRUMENT AND TELESCOPE COMPRISING THE SAME

(71) Applicant: Light Speed Vision (Beijing) Co., Ltd., Beijing (CN)

(72) Inventor: Hongyun Qiu, Beijing (CN)

(73) Assignee: Light Speed Vision (Beijing) Co., Ltd., Beijing (CN)

( * ) Notice: Subject to any disclaimer, the term of this patent is extended or adjusted under 35 U.S.C. 154(b) by 194 days.

(21) Appl. No.: 15/533,028

(22) PCT Filed: Dec. 7, 2015

(86) PCT No.: PCT/CN2015/096579
§ 371 (c)(1),
(2) Date: Mar. 22, 2018

(87) PCT Pub. No.: WO2016/086904
PCT Pub. Date: Jun. 9, 2016

(65) Prior Publication Data
US 2018/0210062 A1    Jul. 26, 2018

(30) Foreign Application Priority Data

Dec. 5, 2014 (CN) .................... 2014 2 0766000 U

(51) Int. Cl.
*G01S 3/786* (2006.01)
*G02B 23/16* (2006.01)
*G02B 7/02* (2006.01)

(52) U.S. Cl.
CPC ............. *G01S 3/7867* (2013.01); *G02B 7/02* (2013.01); *G02B 23/165* (2013.01)

(58) Field of Classification Search
CPC ........ G01S 3/7867; G02B 23/165; G02B 7/02
(Continued)

(56) References Cited

U.S. PATENT DOCUMENTS

2013/0233996 A1* 9/2013 Taylor .................... F16M 11/18
248/550

FOREIGN PATENT DOCUMENTS

CN          2371570 Y      3/2000
CN        102608749 A      7/2012
(Continued)

*Primary Examiner* — Daniel L Murphy
(74) *Attorney, Agent, or Firm* — Gokalp Bayramoglu

(57) ABSTRACT

A polar axis calibration system (100) comprises: a polar scope (10), a polar axis calibration control device (20) and a display device (30). The polar scope comprises an optical lens (11) and an image sensor (12) for collecting constellation images (IM); the polar axis calibration control device receives the constellation images from the polar scope and determines the position (P1) of the rotation center of the polar axis and the celestial pole position (P2), the position of the rotation center of the polar axis means the position of the rotation center (R0) of the polar axis (510) of the equatorial instrument in the plane of the constellation image, and the celestial pole position means the position of the celestial pole in the plane of the constellation image; and the display device is coupled to the polar axis calibration control device and used to display the constellation image, the celestial pole position and the position of the rotation center of the polar axis. The present invention also provides a polar scope, a polar axis calibration control device, as well as an equatorial instrument (500) and an astronomical telescope comprising the aforesaid polar scope or polar axis calibration system. According to the present disclosure, it is possible to align the celestial pole position directly with the rotation center of the polar axis, thus improving the calibration accuracy. Further- (Continued)

more, it is possible to lower the requirements for the installation accuracy of the polar scope.

16 Claims, 8 Drawing Sheets

(58) Field of Classification Search
USPC .................................................. 356/139.01
See application file for complete search history.

(56) References Cited

FOREIGN PATENT DOCUMENTS

| | | |
|---|---|---|
| CN | 202488560 U | 10/2012 |
| CN | 204269938 U | 4/2015 |
| WO | 2004107013 A1 | 12/2004 |

* cited by examiner

POLAR AXIS CALIBRATION SYSTEM, ELECTRONIC POLAR SCOPE, POLAR AXIS CALIBRATION CONTROL DEVICE, AND EQUATORIAL INSTRUMENT AND TELESCOPE COMPRISING THE SAME

The present application is the US national phase application of International Application PCT/CN2015/096579 filed on Dec. 7, 2015, and titled Polar Calibration System, Electronic Polar Lens, Polar Calibration Control Device and Equatorial and Telescope Comprising the Same, which claims priority to the Chinese patent application No. 201420766000.8 titled An Electronic Polar Axis Telescope and filed with State Intellectual Property Office of China on Dec. 5, 2014, both of which are incorporated by reference in their entirety.

BACKGROUND

The present invention relates to an equatorial instrument for an astronomical telescope, and particularly, to an electronic polar scope, a polar axis calibration system and a polar axis calibration control device for the equatorial instrument, as well as an astronomical telescope comprising any of the aforesaid devices.

The Earth rotates with its rotation axis pointing to the celestial pole, that is, the north celestial pole in the Northern Hemisphere, or the south celestial pole in the Southern Hemisphere. Due to the rotation of the Earth, a variety of celestial bodies are watched to be rotating around the celestial pole. However, the astronomical shooting takes a long time for exposure, if the asters are in move, the pictures thus obtained would be an aster track rather than an aster spot. In order to shoot an aster spot, it is needed to drive the telescope to make synchronous rotation while tracing according to the angular velocity of the Earth rotation. The equatorial instrument for the astronomical telescope implements the rotation and tracing by means of its right ascension axis (also called "polar axis"). To implement the rotation and tracing, the polar axis shall accurately point to the north celestial pole or the south celestial pole. So when the equatorial instrument is set up, the first step is to calibrate the polar axis.

The polar axis calibration is usually dependent on the polar scope, and now, almost all of the equatorial instruments are equipped with polar scope. The polar scope is also called polar axis telescope. Existing polar scopes are all optical polar scopes. The optical polar scope is mounted on the right ascension axis of the equatorial instrument, and its optical axis is required to be parallel with the right ascension axis of the equatorial instrument, thus the center of viewing field of the optical polar scope represents the pointing direction of the right ascension axis.

The method for calibrating the polar axis of the equatorial instrument by means of the existing optical polar scope is substantially as follows:

One polar axis reticle is installed in front of the ocular of the polar scope, and the polar axis reticle is marked with the optical center of the polar scope and the position of the North Star. The North Star doesn't exactly locate at the north celestial pole, but goes away from the north celestial pole by a certain distance. Therefore, in the actual adjustment of the polar axis, it is not simply to place the North Star at the optical center of the telescope, but to place the North Star in the polar axis reticle at the position of the North Star. Due to the rotation and revolution of the Earth, the orientation of the North Star relative to the North Pole varies at different dates of the year and different times of the day as well as at difference locations on the Earth in view of the horizon system of coordinates. Moreover, its position would revolve around the north celestial pole by one revolution everyday. Therefore, it is required for existing techniques to calculate the orientation of the North Star relative to the north celestial pole according to the recent time, date and geographical location; then adjust the position of the North Star in the reticle into this orientation; then adjust the horizontal axis and elevation angle of the equatorial instrument so as to place the actual North Star at the position of the North Star in the reticle.

The above prior art for polar axis calibration has two characteristics: 1. the alignment of the celestial pole position is conducted indirectly through the alignment of the position of the North Star; and 2. the optical axis of the polar scope is required to be parallel with the polar axis of the equatorial instrument.

The above techniques for polar axis calibration have the following deficiencies:

Firstly, a pure optical method is employed, whose accuracy is not very high. If a higher accuracy is intended to obtain, a higher magnification for the polar scope is required. However, when the magnification is too great, the viewing field would become very small. Finding the North Star will be very difficult. At present, the field of view of the polar scope of all kinds of equatorial instruments is not great, thus it is not easy to find the aster now. Therefore, the accuracy and the field of view are contradictory. The existent polar scopes have negative impact upon the two aspects when balancing the two.

Secondly, due to the fact that the celestial pole position is indirectly aligned by means of the alignment of the position of the North Star, the polar axis calibration accuracy is subjected to influence of deviation occurred when determining the position of the North Star with respect to the celestial pole;

Thirdly, it is required to ensure the optical axis of the polar scope be parallel with the right ascension axis of the equatorial instrument, which is also very difficult. Moreover, it is difficult to achieve a very high parallelism, resulting in the so-called "taper error". At the same time, it also makes a very high demand for the assembly.

Fourthly, due to the fact that the reference coordinate system is a horizon system of coordinates, the base of the equatorial instrument has to be horizontal so as to ensure that the calculated position on the reticle is made with respect to the horizon system of coordinates. The obtaining of a very precise horizontal is very difficult. The current equatorial instruments each use the spirit bubble to observe the horizontal. Such a manner itself presents a large error, and has difficulty in achieving a horizontal adjustment of high precision. Accordingly, the adjustment of the polar axis also has difficulty in achieving a high precision.

The Chinese patent application CN201210106129.1 discloses a polar axis assisted adjustment system and method for the equatorial astronomical telescope, however, such a system and method still require that the optical axis of the polar scope is parallel with the polar axis of the equatorial instrument, and the position of the North Star is adjusted so as to adjust the celestial pole position, its essence is consistent with the above-mentioned existent method, and differs only in that an image collecting device is used to replace the human eye and a locating device is used to obtain the position where the North Star should be in the image of the polar scope (i.e., the information of the second position of the North Star as described in CN201210106129.1).

SUMMARY

According to one aspect of the present invention, a polar axis calibration system for an equatorial instrument is provided, the equatorial instrument comprises the polar axis, and the polar axis calibration system comprises: a polar scope, comprising an optical lens and an image sensor for collecting constellation images; a polar axis calibration control device, for receiving the constellation image from the polar scope and determining the position of the rotation center of the polar axis and the celestial pole position based on the constellation images, the position of the rotation center of the polar axis means the position of the rotation center of the polar axis of the equatorial instrument in the plane of the constellation image, and the celestial pole position means the position of the celestial pole in the plane of the constellation image; and a display device, coupled to the polar axis calibration control device and being used to display the constellation image, the celestial pole position and the position of the rotation center of the polar axis.

Preferably, the polar axis calibration control device can comprise a rotation-center-of-the-polar-axis determining module which determines the position of the rotation center of the polar axis through the following operations: obtaining three constellation images collected by the polar scope when the polar scope is rotated to three different positions along with the polar axis of the equatorial instrument; finding a same star in the three constellation images; obtaining three position coordinates of the same star in the three constellation images; and calculating the position of the rotation center of the polar axis based on the three position coordinates.

In some embodiments, the polar axis calibration control device can comprise a celestial-pole-position determining module, which determines the celestial pole position through the following operations: obtaining the constellation images collected by the polar scope; identifying three stars in the constellation images; obtaining the star position coordinates of the three stars in the constellation images; and determining the celestial pole position based on the star position coordinates and the relative positional relationship among the third stars and the celestial pole.

Preferably, the celestial-pole-position determining module can comprise a mask identifying module for identifying three stars from the constellation images by means of a star mask, and the star mask has at least three star zones corresponding to the positions of at least three stars in proximity to the celestial pole respectively, wherein the mask identifying module identifies three stars through the following operations: fitting the star mask into the constellation images; moving the star mask so as to bring three of the star zones in the star mask into alignment with three stars in the constellation images; and identifying the three stars according to the three star zones.

More preferably, one of the at least three star zones in the star mask is a characteristic-star star zone corresponding to one star in proximity to the celestial pole. During the process of moving the star mask so as to bring three of the star zones into alignment with three stars in the constellation images, the mask identifying module firstly brings the characteristic-star star zone into alignment with the characteristic star in the constellation images, then rotates the star mask around the characteristic-star star zone to bring other two star zones into alignment with other two stars in the constellation images.

In addition or as an alternative, the celestial-pole-position determining module determines the celestial pole position through the following operations: identifying two stars from the constellation images; obtaining the star position coordinates of the two stars in the constellation images; and determining the celestial pole position based on the star position coordinate, the positional relationship among the two stars and the celestial pole, and a deviation direction of the constellation image with respect to the celestial pole.

Preferably, the celestial-pole-position determining module comprises an atmospheric refraction correcting module, which performs the following operations: obtaining correction amount for the atmospheric refraction according to the geographical latitude and empirical formula; based on the correction amount for the atmospheric refraction, determining the correction distance in the constellation images according to the image angular resolution of the constellation image; determining the height direction of the horizon system of coordinates in the constellation images; and moving the celestial pole position by the correction distance along the height direction of the horizon system of coordinates in the plane of the constellation image to obtain a corrected celestial pole position.

Preferably, the polar scope is further integrated with an acceleration sensor which is used for measuring the gravity direction of the polar scope and is coupled with the polar axis calibration control device. The atmospheric refraction correcting module can determine the height direction of the horizon system of coordinates of the constellation image through one of the following manners:

a. obtaining the height direction of the horizon system of coordinates of the images by using data from the acceleration sensor of the polar scope;

b. making an plate solving to obtain the orientation of the constellation images in the equatorial coordinate system, then obtaining the angle of the equatorial coordinate system relative to the horizon system of coordinates according to the local time, and calculating the height direction of the horizon system of coordinates in the constellation images; and c. when the polar axis of the equatorial instrument rotates so as to bring the polar scope located on the equatorial instrument to rotate to a preset position where the image horizontal direction of the constellation images coincides with the horizon direction, recording the height direction in the constellation image as the height direction of the horizon system of coordinates.

Preferably, the polar scope further comprises a body, inside of which the optical lens and the image sensor are housed, and the outer surface of the body is provided thereon with an indication sign indicating the image horizontal direction or image height direction in the constellation images collected by the polar scope.

Preferably, the polar axis calibration control device can further comprise a polar axis aligning module, and based on the celestial pole position and the position of the rotation center of the polar axis, the polar axis aligning module calculates the azimuth angle adjustment amount and the elevation angle adjustment amount for the polar axis of the equatorial instrument that are required to bring the position of the rotation center of the polar axis into alignment with the celestial pole position, and display the azimuth angle adjustment amount and the elevation angle adjustment amount on the display device.

Preferably, the polar axis calibration system can further comprise an automatic polar axis alignment mechanism, the automatic polar axis alignment mechanism is coupled to the polar axis calibration control device, and comprises a horizontal azimuth angle adjustment motor that drives the equatorial instrument to rotate about its horizon axis and an elevation angle adjustment motor that drives the pitch motion of the polar axis of the equatorial instrument; and the polar axis calibration control device can further comprise a polar axis aligning module, and based on the celestial pole position and the position of the rotation center of the polar axis, the polar axis aligning module calculates the azimuth angle adjustment amount and the elevation angle adjustment amount for the polar axis of the equatorial instrument that are required to bring the position of the rotation center of the polar axis into alignment with the celestial pole position, and sends them to the automatic polar axis alignment mechanism so as to control the horizontal azimuth angle adjustment motor and the elevation angle adjustment motor.

According to another aspect of the present invention, an electronic polar scope is provided, which comprises: a telescope body; an optical lens assembled in a front portion of the telescope body; and image sensors, image transmission circuit and interface provided at a rear portion of the telescope body.

Preferably, the rear portion of the telescope body is provided with circuits for measuring the electronic inclination angle and geomagnetic azimuth angle. The image sensor can be a CMOS image sensor, and an USB port can be provided on a lower sider of the rear portion of the telescope body.

Preferably, the outer surface of the telescope body is provided with an indication sign indicating the image horizontal direction or image height direction in the constellation images collected by the polar scope.

According to another aspect of the present invention, a polar axis calibration control device for an equatorial instrument is provided. The polar axis calibration control device receives constellation images from a polar scope, which is assembled on the equatorial instrument and rotates along with the polar axis, and determines the position of the rotation center of the polar axis and the celestial pole position, the position of the rotation center of the polar axis means the position of the rotation center of the polar axis of the equatorial instrument in the plane of the constellation image, and the celestial pole position means the position of the celestial pole in the plane of the constellation image. The polar axis calibration control device comprises a rotation-center-of-the-polar-axis determining module and a celestial-pole-position determining module. The rotation-center-of-the-polar-axis determining module determines the position of the rotation center of the polar axis through the following operations: obtaining three constellation images collected by the polar scope when the polar scope is rotated to three different positions along with the polar axis of the equatorial instrument; finding a same star in the three constellation images; obtaining three position coordinates of the same star in the three constellation images; and calculating the position of the rotation center of the polar axis based on the three position coordinates. The celestial-pole-position determining module determines the celestial pole position through the following operations: obtaining the constellation images collected by the polar scope; identifying at least two stars in the constellation images; obtaining the star position coordinates of the two stars in the constellation images; and determining the celestial pole position based on the star position coordinates and the relative positional relationship among the stars and the celestial pole.

According to yet another aspect of the present invention, an equatorial instrument is provided, which comprises the polar axis calibration system and/or the polar scope as mentioned above.

According to yet another aspect of the present invention, an astronomical telescope is provided, which comprises the polar axis calibration system and/or the polar scope as mentioned above.

BRIEF DESCRIPTION OF THE DRAWINGS

Other features, objects, and advantages of the present invention will become more apparent from the following detailed description of the present invention when taken in conjunction with the accompanying drawings, in which.

DETAILED DESCRIPTION

The present application will now be described in further detail with reference to the accompanying drawings and examples. It is to be understood that the specific embodiments described herein are for the purpose of explaining the related invention and are not intended to limit the invention. It should also be noted that, for the sake of convenience of description, only parts related to the invention are shown in the accompanying drawings. To be specified, the embodiments in the present application and the features in the embodiments can be combined with each other without conflict.

Figure 1:
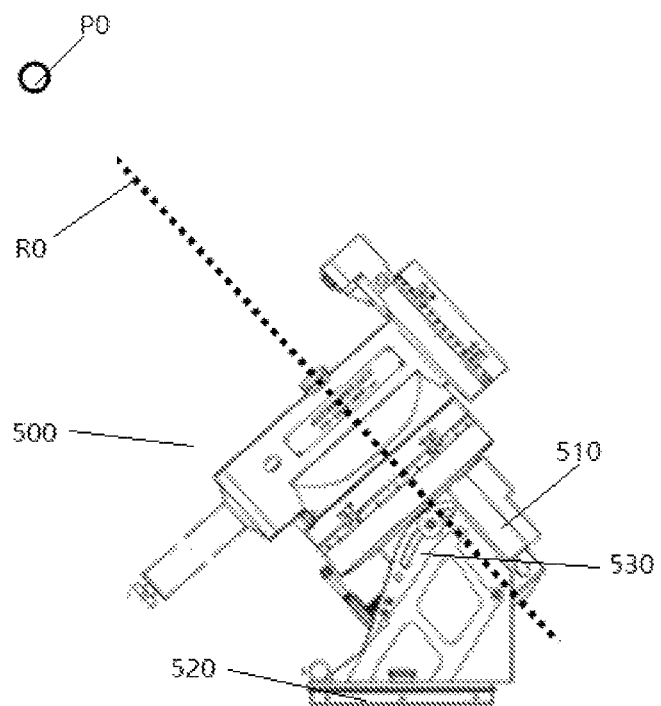
FIG. 1 is a schematic view of an equatorial instrument, to which the polar axis calibration system according to embodiments of present invention can be applied.

FIG. 1 exemplarily illustrates an equatorial instrument 500 to which the electronic polar scope and the polar axis calibration system according to the embodiment of present invention can be applied. The equatorial instrument 500 has a polar axis (also called "right ascension axis") 510. The rotation center R0 of the polar axis 510 means its rotation axis. To trace the revolution of the celestial bodies with respect to the Earth caused by the Earth rotation, the rotation center R0 of the polar axis 510 should be adjusted to be in alignment with the celestial pole P0 pointed by the Earth rotation axis. That is the polar axis calibration. The celestial pole P0 is the north celestial pole in Northern Hemisphere, and is the south celestial pole in Southern Hemisphere. The equatorial instrument 500 can be provided with a horizon axle 520 for adjusting the horizontal azimuth angle of the polar axis 510 and an elevation angle adjustment mechanism 530 for adjusting the elevation angle of the polar axis 510. The illustration presented in FIG. 1 about the structure and position of the horizon axle 520 and the elevation angle adjustment mechanism 530 is only illustrative.

Figure 2:
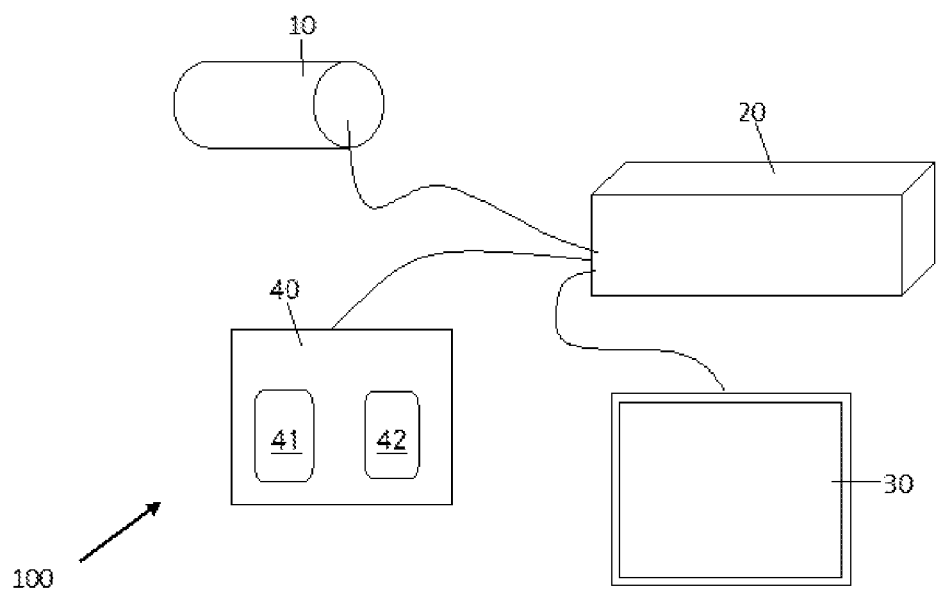
FIG. 2 is a schematic view of the polar axis calibration system according to embodiments of present invention.

The embodiments according to the present invention propose a polar axis calibration system 100 used for the equatorial instrument 500, as shown in FIG. 2. The polar axis calibration system 100 comprises a polar scope 10, a polar axis calibration control device 20 coupled to the polar scope 10, and a display device 30 coupled to the polar axis calibration control device 20. Alternatively, the polar axis calibration system 100 can further comprise an automatic polar axis alignment mechanism 40.

Figure 3:
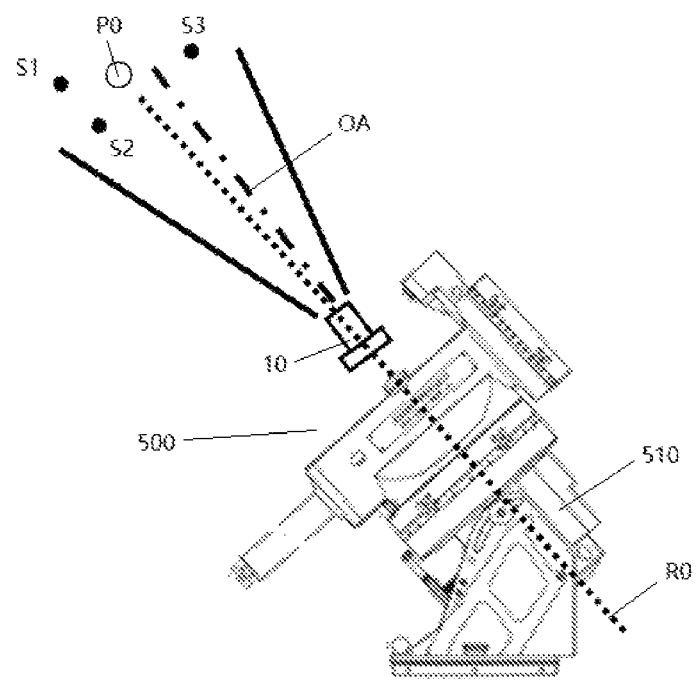
FIG. 3 shows schematically one kind of assembling of the polar scope on the equatorial instrument.
Figure 4:
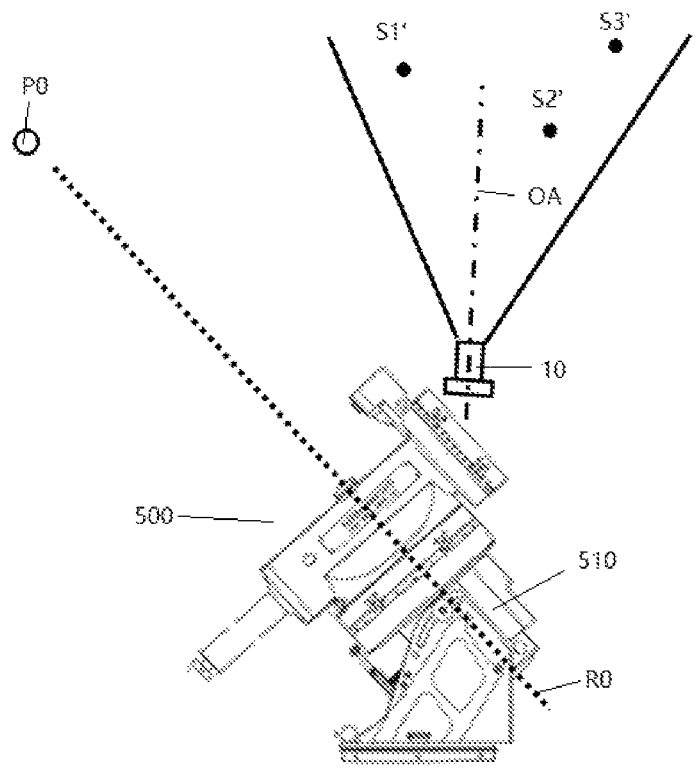
FIG. 4 shows schematically another kind of assembling of the polar scope on the equatorial instrument.

The polar scope 10 comprises an optical lens 11 and an image sensor 12 (see FIG. 5A) used for collecting the constellation images. The polar scope 10 can be assembled onto the equatorial instrument 500 at a location rotating along with the polar axis 510 of the equatorial instrument 500. For example, the polar scope 10 can be assembled at one end of the polar axis 510 facing the celestial pole along the direction of the polar axis 510, as shown in FIG. 3. Alternatively, in other embodiments, the polar scope 10 can be assembled at a location offset from the polar axis 510, as shown in FIG. 4. Moreover, according to the embodiment of present invention, the optical axis OA of the polar scope 10 can be or can not be parallel with the polar axis 510 of the equatorial instrument 500 (see FIGS. 3 and 4), which will be described in more details hereinafter.

The polar axis calibration control device 20 receives constellation images from the polar scope 10, and based on the constellation images, determines the position P1 of the rotation center of the polar axis and the celestial pole position P2. The position P1 of the rotation center of the polar axis means the position of the rotation center R0 of the polar axis 510 of the equatorial instrument 500 in the plane of the constellation image. The celestial pole position P2 means the position of the celestial pole P0 in the plane of the constellation image.

The polar axis calibration control device 20 can comprise hardwires, such as chips, microprocessor, integrated circuits, circuit boards, other elements and devices and the combination thereof; and can further comprise firmware's and/or software programs. The polar axis calibration control device 20 can be configured with general desktop computer, notebook computer, a single board computer comprising an ARM processor, and any other suitable devices, for example.

The display device 30 is coupled to the polar axis calibration control device 20, and displays the constellation images, the position P1 of the rotation center of the polar axis and the celestial pole position P2.

The display device 30 can be a display having display function alone, or a display having a function of interacting with a user, such as a touch screen.

The polar axis calibration control device 20 and the display device 30 can be assembled onto the equatorial instrument 500 respectively, for example, on the polar axis 510 or on the declination axis comprised in the equatorial instrument 500. Nevertheless, their placement can also be independent of the equatorial instrument 500. For example, the polar axis calibration control device 20 and/or the display device 30 can be placed on a separate bracket provided next to the equatorial instrument 500.

Although the polar axis calibration control device 20 and the display device 30 here are describe as two devices, the skilled in this art would understood that they can be integrated into one entity.

The polar axis calibration control device 20 can comprise a rotation-center-of-the-polar-axis determining module 21 and a celestial-pole-position determining module 22, for determining the position P1 of the rotation center of the polar axis and the celestial pole position P2, respectively.

After obtaining the position P1 of the rotation center of the polar axis and the celestial pole position P2, it is possible to adjust the horizontal azimuth angle and elevation angle of the polar axis 510 through user's manual adjustment, automatic adjustment or the combination of both, until the position P1 of the rotation center of the polar axis coincides with the celestial pole position P2, that is, to achieve the polar axis calibration. In some embodiments, the polar axis calibration system 100 can further comprise an automatic polar axis alignment mechanism 40.

Although it is shown in the drawings that the polar scope 10, the polar axis calibration control device 20, the display device 30 and the automatic polar axis alignment mechanism 40 are coupled with each other in a wired way, the skilled in this art should appreciate that the present invention is not limited in this aspect, but can employ a wireless connection capable of signal transmission, for example, Wi-Fi or Bluetooth techniques and the like.

The possible configuration of the polar axis calibration system 100 is described below in an exemplary manner in conjunction with the various operations accomplished in the polar axis calibration system 100. [Image collection and polar scope]

Figure 5A:
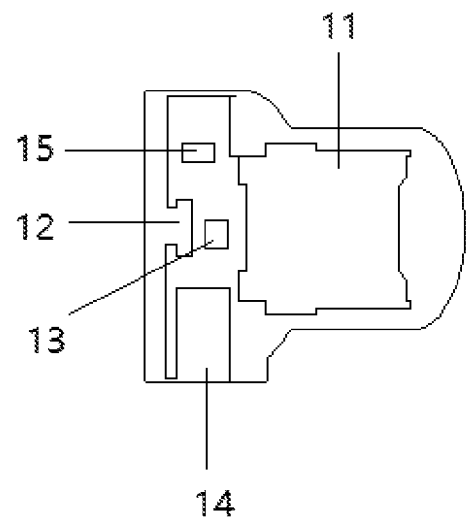
FIG. 5A is a schematic longitudinal sectional view of the polar scope.

As shown in FIG. 5A, the polar scope 10 comprises an optical lens 11 and an image sensor 12, for collecting constellation images. The optical lens 11 can be designed to have a greater viewing field than the astronomical telescope in order to facilitate finding the stars, thus helping the polar axis calibration. The image sensor 12 can be a CCD sensor, or a CMOS sensor etc., and the present invention has no limitation in this respect. The collected constellation images are transmitted to the polar axis calibration control device 20 and displayed on the display device 30.

The electronic polar scope 10 according to the embodiment of present invention employs an image sensor 12 to obtain images. Since the image sensor can have a very high pixel density, the angular resolution corresponding to each of the pixel can be improved much higher than that of the eye. Furthermore, as mentioned below in the calculation of the celestial pole position according to the star position, the calculation of the celestial pole position can be made in a sub-pixel calculation method in which one decimal point is reserved. This can further improve the angular resolution by several times. At the same time, since the image sensor could achieve a very high (such as megapixels) pixel numbers, it can also be used to achieve a larger viewing field, thus solving the problem of improving both the accuracy and viewing field. By way of example, when the objective lens has a focal length of 25 mm, the image sensor has a pixel dimension of 3.75 um, and the pixel number is 1280*960 in one electronic polar scope, it could reach a viewing field of up to 15°*10° and a single pixel resolution of up to 30 arc-second, and it maximum angular resolution could be up to 3-6 arc-second in consideration of the sub-pixel algorithm.

According to some embodiments of the present invention, the polar scope 10 could use the optical polar axis telescope installed in the polar axis of current equatorial instruments as its optical lens, and the image sensor 12 is attached at the ocular of the optical polar scope.

Preferably, the polar scope 10 in other embodiments could be configured as a stand-alone electronic polar scope separated from the equatorial instrument. This allows the equatorial instrument to have no conventional optical polar axis telescope equipped therewith. The conventional optical polar scope is assembled inside of the polar axis (that is, the right ascension axis) of the equatorial instrument, thus the size of the polar axis is large, which does not facilitate the compactness and portability of the equatorial instrument. On the other hand, the polar scope 10 according to the embodiment of present invention is formed into a separate component, its structure could be made even more compact and portable.

Figure 5B:
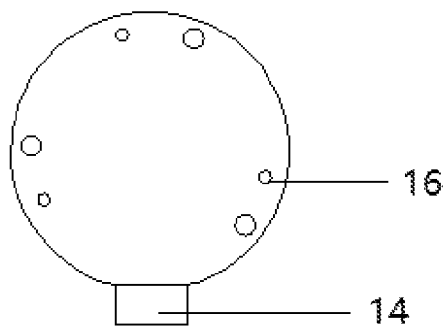
FIG. 5B is a view of the polar scope viewed from the rear end.
Figure 5C:
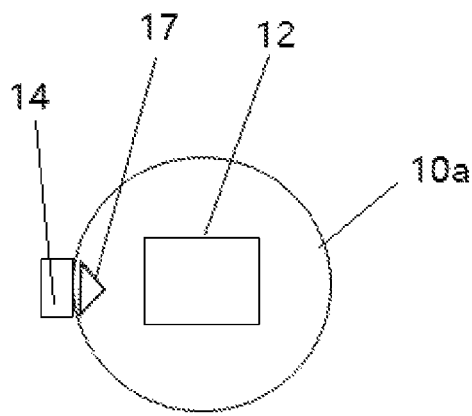
FIG. 5C is a schematic view illustrating the positional relationship between an indication sign on the polar scope body and an image sensor.

In the other embodiments as shown in FIGS. 5A, 5B, and 5C, the polar scope 10 can comprise a telescope body 10a for integrally receiving the optical lens 11 and the image sensor 12. The optical lens 11 is assembled in a front portion of the body 10a, and the image sensor 12 is assembled at a rear portion of the body 10a.

As shown in FIG. 5A, the polar scope 10 can further comprise an image transmission circuit 13 and an interface 14 housed within the body 10a. The interface 14 can be for example an USB port, a serial interface, a HDMI interface etc., and can also be a wireless signal interface capable of transmitting wireless signals. The image sensor 12 can be coupled with the image transmission circuit 13 via a bus (e.g., I2C line). The image transmission circuit 13 is coupled with the polar axis calibration control device 20 through the interface 14.

Preferably, the polar scope 10 further comprises a measuring circuit 15 provided at the rear portion of the body 10a (see FIG. 5A). The measuring circuit 15 can comprise one or more of a group consisting of a triaxial accelerometer, a triaxial geomagnetic force sensor and a triaxial gravity force sensor. The measuring circuit 15 is used to measure the posture of the polar scope 10 in the gravity coordinate system so as to determine the relative relationship between the horizontal direction of the horizon system of coordinates and the obtained constellation images. The measuring circuit 15 is coupled with the polar axis calibration control device 20 through the interface 14.

In other embodiments as shown in FIG. 5B, for example, the polar scope body 10a can be evenly provided with several connection features 16 at its bottom surface, such as screw hole, for securing the polar scope 10 onto the equatorial instrument 500. It is to be understood that the specific form and its setting position of the connection features 16 are merely exemplary herein, and the skilled in this art could design other forms of connection features as required, and the present invention is not limited in this respect. The polar scope can be secured onto the polar axis 510 of the equatorial instrument (as shown in FIG. 3), and it can also be secured onto the equatorial instrument 500 at other locations. The optical axis OA of the polar scope 10 can be not coaxial with the polar axis 510 of the equatorial instrument, and can also be not parallel with the polar axis (as shown in FIG. 4). The viewing field of the polar scope can comprise the celestial pole position (as shown in FIG. 3), and can also not enclose the celestial pole position (as shown in FIG. 4).

In other embodiments, the outer surface of the telescope body 10a is preferably with an indication sign 17 for indicating the image horizontal direction or image height direction of the constellation image collected by the polar scope 10. FIG. 5C illustrates one example of such an indication sign. When assembling the polar scope 10, for example, it is possible to make the direction indicated by such an indication sign 17 consistent with the direction of one side of the image sensing element array of the image sensor 12, as shown in FIG. 5C, so that the direction indicated by the indication sign 17 is consistent with the direction of one side of the image collected by the image sensor 12.

When assembling the polar scope 10 to the equatorial instrument 500, it is possible, but not limited to, that the polar scope 10 is in the direction indicated by the indication sign 17 is consistent with the horizontal or height direction of the horizon system of coordinates when the polar axis 510 of the equatorial instrument is in a preset position (for example, initial position).

[Determination of the Position of the Rotation Center of the Polar Axis]

In some embodiments, the rotation-center-of-the-polar-axis determining module 21 of the polar axis calibration control device 20 performs the following operations so as to determine the position P1 of the rotation center of the polar axis S11: Obtaining three constellation images collected by the polar scope 10 when being rotated to three different positions along with the polar axis 510 of the equatorial instrument;

S12: Finding the same star in the three constellation images;

S13: Obtaining three position coordinates of the same star in the three constellation images; and S14: Calculating the position of the rotation center of the polar axis based on the three position coordinates.

When looking for the same star, a way that interacts with the user can be used. For example, the user directly specifies the star through the user interface further contained in the polar axis calibration control device 20; it can also be identified by a software based on astronomical information, for example, through the plate solving method; alternatively, the same star can be found using an image recognition algorithm.

Figure 6:
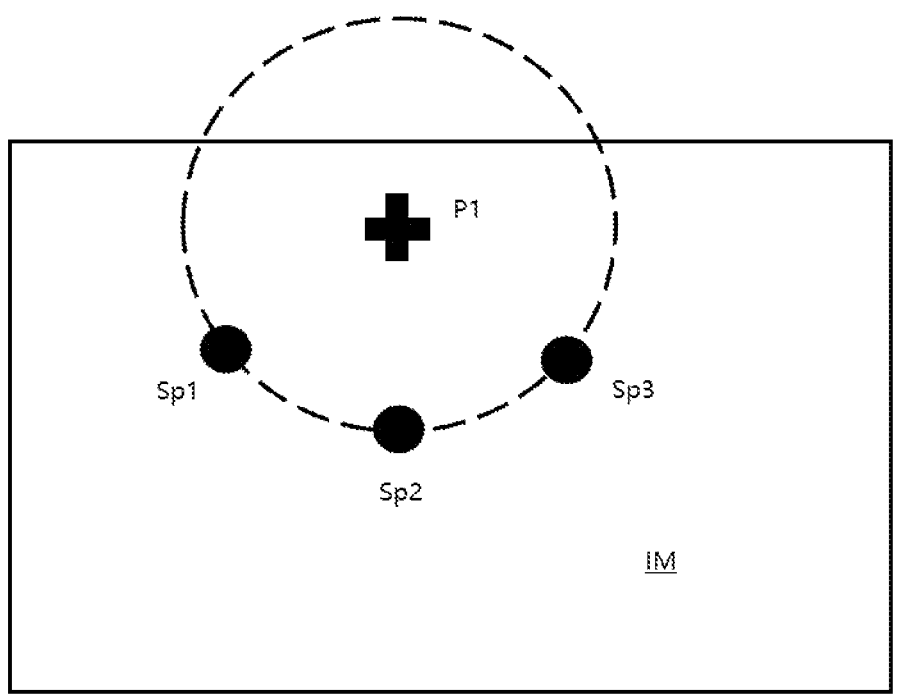
FIG. 6 is a schematic view illustrating the determination of the rotation center of the polar axis.

When the polar axis 510 of the equatorial instrument rotates, the same star rotates around the rotation center R0 of the polar axis in the constellation image IM. Accordingly, as shown in FIG. 6, the three positions Sp1, Sp2, and Sp3 of the same star fall onto the same circle, and the centre of the circle corresponds to the position P1 of the rotation center R0 of the polar axis in the constellation image IM. The specific method, by which the rotation-center-of-the-polar-axis determining module 21 calculates the centre of the circle where the three positions Sp1, Sp2, and Sp3 are located, is conventional; and detailed description thereof is omitted here.

Since the polar axis calibration system 100 according to the embodiment of present invention determines the position of the rotation center of the polar axis through the above method, rather than assuming that the rotation center R0 of the polar axis is located at the center position in the constellation image collected by the polar scope 10, thus such a system doesn't require the optical axis OA of the polar scope 10 be parallel with the polar axis 510 of the equatorial instrument. Compared to the prior art, this greatly facilitates the installation of the polar scope, and also avoids deviation of the polar axis caused by the optical axis being not parallel with the polar axis In the meantime, the polar axis calibration system 100 calculates the position P1 of the rotation center of the polar axis through rotating the polar axis 510 of the equatorial instrument and based on the circle fitting of the star positions, such a method is simple to carry out, quick and accurate.

Figure 7:
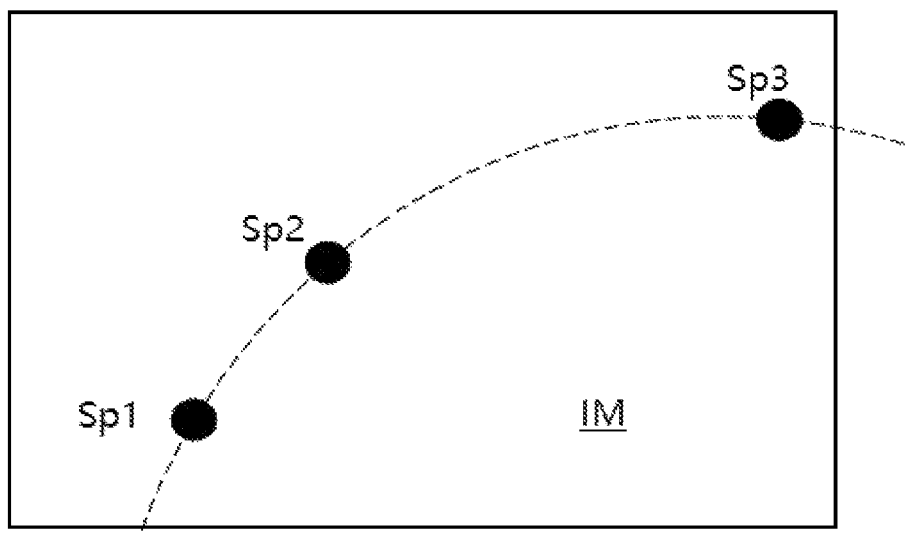
FIG. 7 is a schematic view illustrating the case in which the rotation center of the polar axis is outside of the constellation image.

FIG. 6 illustrates that the position P1 of the rotation center of the polar axis is located within the image scope of the constellation image IM. Nonetheless, it should be understood that, when the optical axis OA of the polar scope 10 forms a larger angle with the rotation center (rotation axis) R0 of the polar axis (as shown in FIG. 4), the rotation center R0 of the polar axis does not fall into the image scope of the constellation image IM. The polar axis calibration system 100 according to the embodiment of present invention can be well adapted for such a situation. Specifically, when the rotation center R0 of the polar axis is not within the image scope of the constellation image IM, the polar axis calibration control device 20 could extend the coordinate system of the constellation image IM to a larger scope in the plane where this image is placed, and even to the plane where the entire constellation image is located; in this way, the position P1 of the rotation center of the polar axis can be recorded with coordinate values outside of the constellation image scope (see FIG. 7). This aspect is also applicable to the case where the celestial pole position P2 is not within the constellation image scope.

[Determination of the Celestial Pole Position]

Three-Star Locating

In some embodiments, the celestial-pole-position determining module 22 of the polar axis calibration control device 20 can determine the celestial pole position P2 by means of a three-star identification locating manner.

Specifically, in the above embodiments, the celestial-pole-position determining module 22 carries out the following operations to determine the celestial pole position P2:

S21: Obtaining the constellation image IM collected by the polar scope 10;

S22: Identifying three stars S1, S2 and S3 from the constellation image IM; obtaining the star position coordinates of the third stars in the constellation images; and S23: Determining the celestial pole position based on the star position coordinates and the relative positional relationship between the third stars S1, S2, S3 and the celestial pole.

Here, the utilized positional relationship between the stars and the celestial pole can be a distance and/or an angle, for example. In a short term (for example, decades), the changes in the distance and angle of the stars with respect to each other and with respect to the celestial pole are extremely small. Accordingly, the polar axis calibration system 100 according to the embodiment of present invention does not need to obtain the azimuth angle of the North Star or other stars with respect to the celestial pole, and does not need to require the equatorial instrument to be horizontal in the process of polar axis calibration, either.

As to the operation S22, in some embodiments according to the present invention, the identification of three stars in the constellation image IM can be achieved utilizing a star mask.

Figure 8:
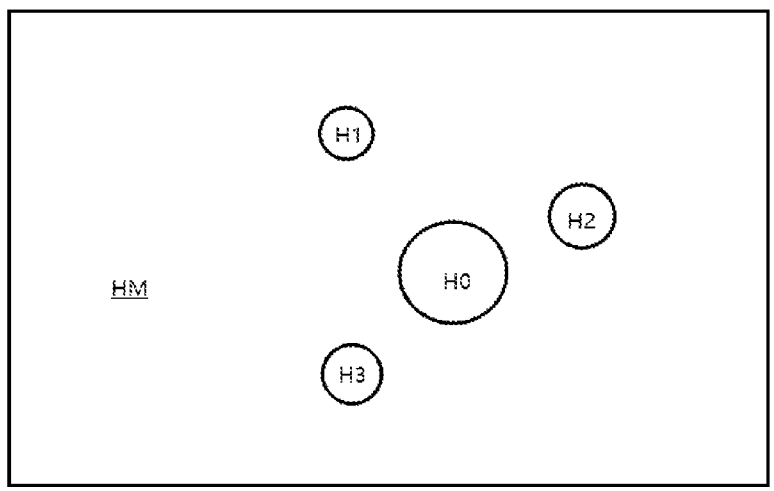
FIG. 8 is a schematic view showing a star mask.

The star mask HM (see FIG. 8) is made according to the stars in the constellation, such as the stars in proximity to the celestial pole. The mask has at least three star zones H0, H1, H2, H3 . . . , which correspond respectively to the positions of at least three stars in proximity to the celestial pole. The star zones H0, H1, H2, H3, and the non-star zones can be distinguished from each other by, for example, whether or not the mask in such a zone is transparent. For example, the star zones can be of a translucent color, and the non-star zone is of a transparent color. Alternatively, the star zones and the non-star zones can also be distinguished from each other by the circle marks around the star zones (see FIG. 8), and the present invention is not limited in this respect. Preferably, one of the star zones H0, H1, H2, H3 . . . can be formed as a characteristic-star star zone, and as shown in FIG. 8, the star zone H0 corresponds to a star having obvious characteristics (e.g., the brightest)(such a star is called a "characteristic-star" herein).

The star mask HM can be supplied to the polar axis calibration control device from, for example, the outside of the polar axis calibration control device 20. The star mask HM can also be made by the polar axis calibration control device 20 based on the constellation images collected by the polar scope 10 and associated astronomical information. The present invention has no limitation in this aspect.

Figure 15:
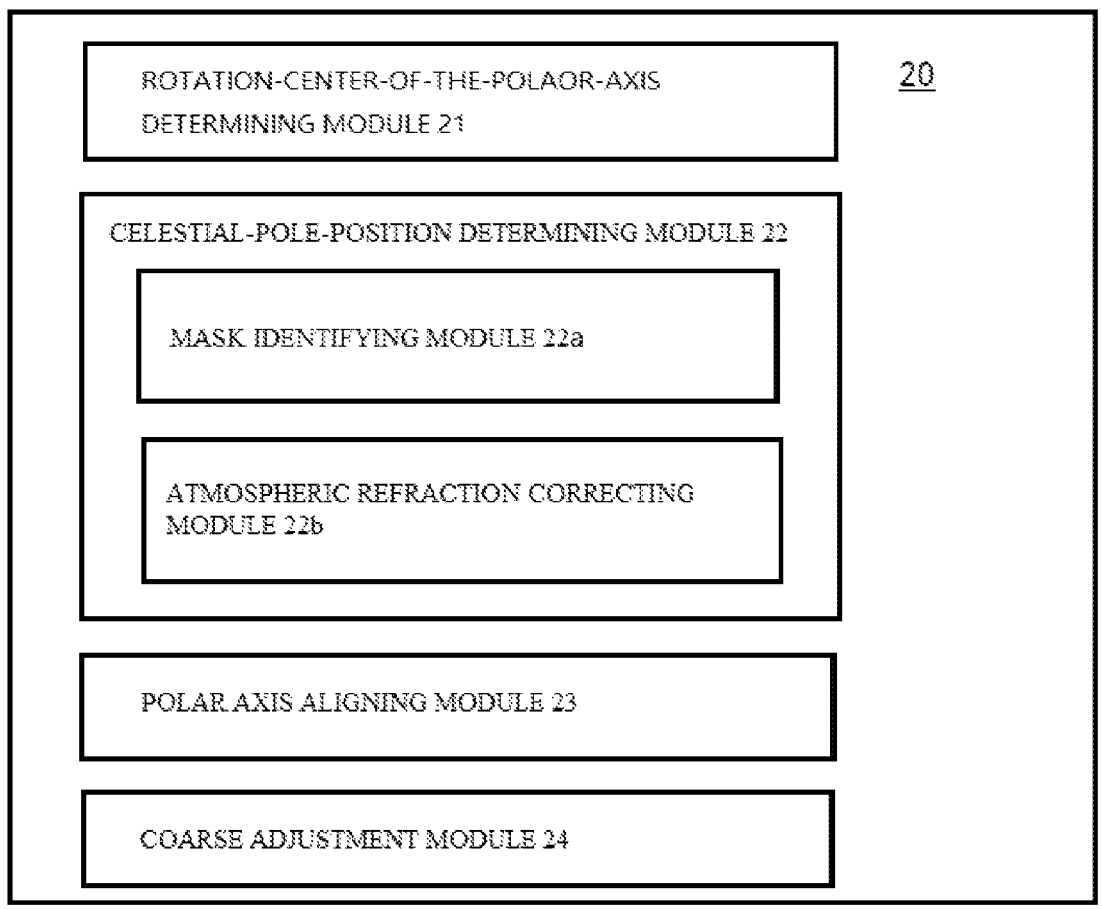
FIG. 15 is an exemplary schematic view of the polar axis calibration control device.

Correspondingly, the celestial-pole-position determining module 22 can comprise a mask identifying module 22a (see FIG. 15), and the mask identifying module 22a identifies three stars from the constellation image IM utilizing the star mask HM. The mask identifying module could identify three stars through the following operations:

S31: fitting the star mask HM into the constellation image IM;

S32: moving the star mask HM so as to bring at least three of the star zones in the star mask into alignment with at least three stars in the constellation images (see FIG. 10); and S33: identifying three stars according to three of the star zones that are brought into alignment (for example, the star zones H0, H1, H2).

Figure 9:
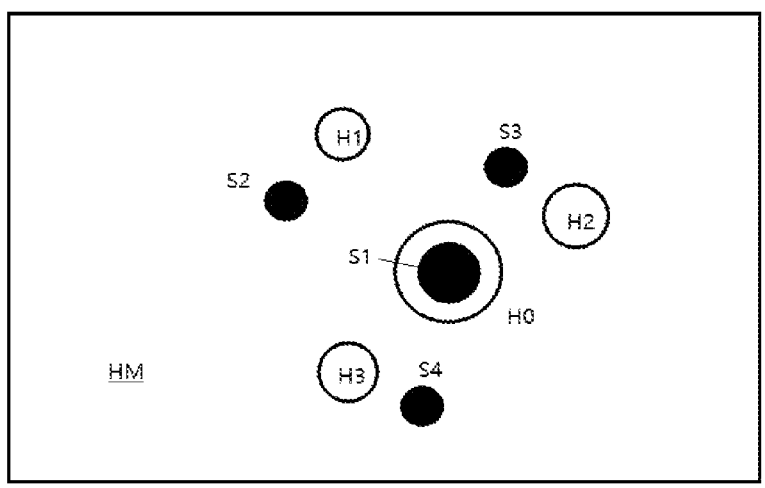
FIG. 9 is a schematic view showing the state when the characteristic-star is in alignment with the characteristic-star star zone of the star mask.
Figure 10:
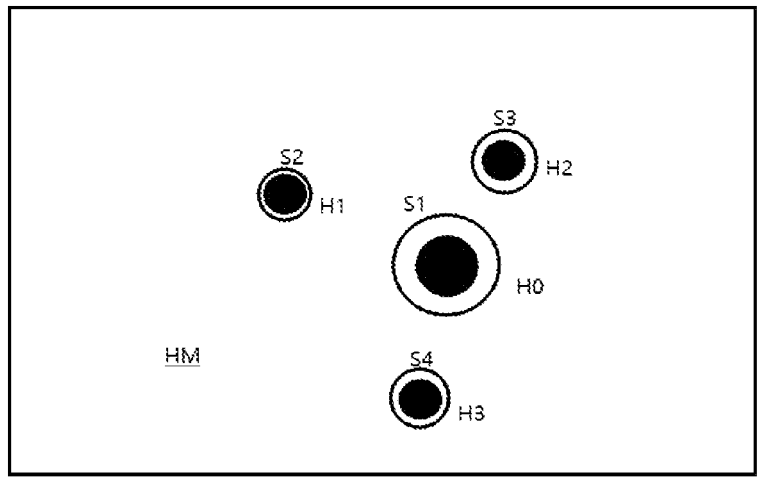
FIG. 10 is a schematic view of a successful star mask matching.

For operation S32, by way of example, the mask identifying module 22a can firstly put the characteristic-star star zone H0 into alignment with the characteristic-star (e.g., S1) in the constellation image, as shown in FIG. 9. This process can be performed by the polar axis calibration control device 20 and the user interactively. Then the star mask HM is rotated around the characteristic-star star zone H0 so that other star zones (e.g., H1, H2) is in alignment with other stars (e.g., S2, S3) in the constellation image, as shown in FIG. 10. The rotation, movement etc. of the mask can be achieved by input medias (such as a mouse roller, a keyboard, or a control located at the interface), or automatically by software program.

Usually, when three star zones of the mask are in alignment with corresponding stars, other star zones on the mask will also be in alignment with corresponding stars, the specific number depends on the number of star zones on the mask and the blocking of the stars in the constellation as well as other factors. At this moment, the mask identifying module will select three of the stars; however, the present invention is not limited regarding the number of the star zones and stars aligned with each other in detail, but the number can be three or more.

The above describes the manner in which the stars are identified through the mask, however, in addition or alternative to the operation S2, the polar axis calibration control device 20 can receive star identification information from the operator via an user interface, and the celestial-pole-position determining module 22 identifies three stars in the constellation image based on such a star identification information.

When three stars are identified, the celestial-pole-position determining module 22 can retrieve information about the relative positional relationship of the three stars and the celestial pole, obtain star position information of the three stars in the constellation image, and calculate the celestial pole position P2 based on the relative positional relationship and the star position coordinate.

The information of the relative positional relationship between the stars and the celestial pole can be stored in advance in the memory (not shown) contained in the polar axis calibration control device 20, and it can also be supplied from the outside, for example, obtained from other apparatus or internet through, for example, a Wi-Fi or Bluetooth connection. The present invention is not limited in this respect.

As to operation S23, a calculation example for calculating the celestial pole position according to the positions of three known stars is give in a non-limiting manner.

Figure 11:
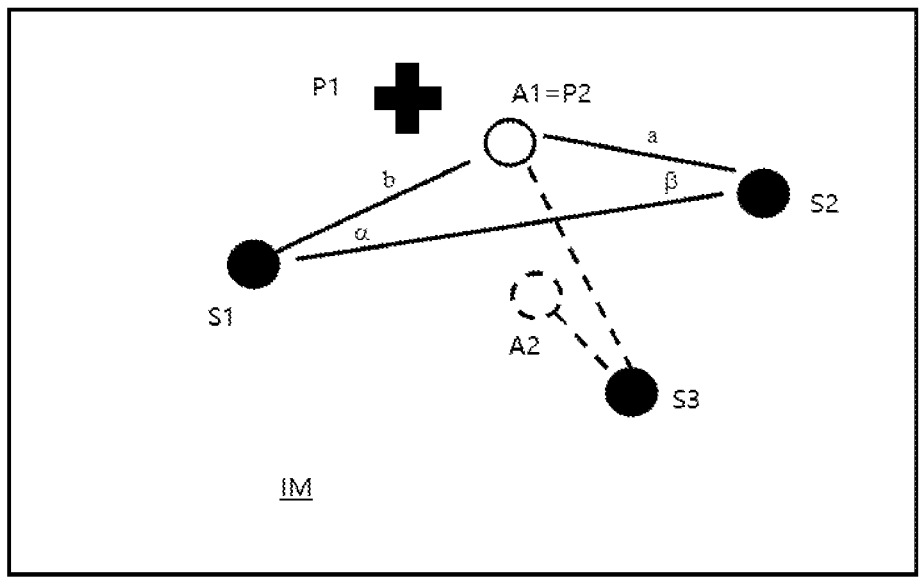
FIG. 11 is a schematic view illustrating the determination of the celestial pole position.

Assuming that the coordinates of the celestial pole P0 are (x, y), the coordinates of two stars S1 and S2 in the identified three stars are $(x_1, y_1)$, $(x_2, y_2)$, respectively. According to the astronomical data, we can get the angles α and β formed by the connecting line between the stars S1 and S2 with their connection lines to the celestial pole P0, as shown in FIG. 11.

The triangle constituted by the celestial pole p0 and the stars S1, S2 satisfies the following geometric formulas:

$$\frac{a}{\sin\alpha} = \frac{b}{\sin\beta} \quad (1)$$

$$(x-x_1)^2+(y-y_1)^2=b^2$$

$$(x-x_2)^2+(y-y_2)^2=a^2 \quad (2)$$

wherein a is the distance between the celestial pole P0 and the star S1 in the constellation image, b is the distance between the celestial pole P0 and the star S2 in the constellation image, and the distances a and the distance b can be determined according to the astronomical data and the imaging magnification of the polar scope.

It is derived from the above geometric formula (2) that:

$$b^2-a^2=2x(x_2-x_1)+x_1^2-x_2^2+2y(y_2-y_1)+y_1^2-y_2^2 \quad (3)$$

Let:
$k=b^2-a^2+x_2^2-x_1^2+y_2^2-y_1^2$
$\Delta x=x_2-x_1$
$\Delta y=y_2-y_1$ substitute the above into the above equation (3), and obtain through calculation that:

$$x = \frac{k - 2y\Delta y}{2\Delta x} \quad (4)$$

Since a, b, and $(x_1, y_1)$, $(x_2, y_2)$ are known, k, Δx, Δy are constants.

Substitute the equations (4) into the above geometric formulas (1) and (2) and obtain a quadratic equation with one variable through simplification:

$$\left[\left(\frac{\Delta y}{\Delta x}\right)^2 + 1\right]y^2 + \left[\frac{\Delta y}{\Delta x}\left(2x_1 - \frac{k}{\Delta x}\right) - 2y_1\right]y + \left[\left(\frac{k}{2\Delta x}\right)^2 + y_1^2 - b^2\right] = 0$$

Thus two solutions A1, A2 for (x, y) are obtained.

Then one of the solutions, A2, can be excluded according to the distance from the celestial pole to the third star S3, and thus a unique solution A1 for the celestial pole position P2 is obtained.

For example, when the coordinates of the star S1 are (727, 312), the coordinates of the star S2 are (680, 494), and α=12.8638428215844, β=18.9000571563, it can be obtained according to the above formulas as well as the position of S3 and its distance from the celestial pole (not given):

x=674.472889441324; y=414.876390129288;

That is, the coordinates of the celestial pole P0 are (674.5, 414.9). One decimal place can be reserved in order to obtain a sub-pixel level of the celestial pole accuracy. This can further improve the angular resolution by several times.

When it is know that the coordinates of the celestial pole position are to be solved according to the positions of the identified three stars as well as the relative positional relationship between them and the celestial pole, as proposed by the present invention, the skilled in this art will understand that specific calculation method is not limited to the methods in the above calculation examples.

Two-Star Locating

In some embodiments, the celestial-pole-position determining module 22 of the polar axis calibration control device 20 can determine the celestial pole position P2 by means of a two-star identification locating manner.

Specifically, the celestial-pole-position determining module 22 carries out the following operations to determine the celestial pole position P2:

S41: Identifying two stars from the constellation images;

S42: Obtaining the star position coordinates of the two stars in the constellation image; and S43: Determining the celestial pole position based on the star position coordinate, the positional relationship between the two stars and the celestial pole, and a deviation direction, in which the constellation image is deviated from the celestial pole.

As having been embodied in the above operation S43, the two-star identification locating manner is applicable for the situation where the deviation direction of the celestial pole with respect to the identified two stars is known. For example, when the viewing field of the polar scope 10 does not contain the south and north celestial poles and is evidently deviated toward a side of the equator, one of the two positions calculated through the trigonometric relation constituted between the identified two stars and the celestial pole obviously cannot be the position where the celestial pole is located. At this time, it is not necessary to identify the third star as in the previously described three-star locating manner to help exclude one of the two celestial pole positions. Accordingly, the two-star locating manner can be used.

When using the two-star locating manner, in some embodiments, the celestial-pole-position determining module 22 can also utilize the star mask, and in the case where at least three star zones in the star mask are in alignment with the stars, two of the stars are selected to calculate the celestial pole position. The specific calculation method can be the same as the method of solving the celestial pole position based on the coordinates of the stars S1 and S2 in the calculation example given above. It will be understood by those skilled in the art that the specific calculation method is not limited to this calculation example.

Regardless of the celestial-pole-position determining module 22 employing the three-star locating manner or the two-star locating manner, in addition to or as an alternative of the mask identification, manual identification or interactive identification, the celestial-pole-position determining module 22 can also employ the plate solving method to identify the stars. For example, the celestial-pole-position determining module 22 can calculate the equatorial coordinate of the image center of the constellation image, the orientation of the image, and the pixel angular resolution of the image by using astronomical data and telescope parameters in conjunction; then select two stars from the constellation image, for example, two stars with a larger distance therebetween; calculate the star equatorial coordinates of the two stars according to the positions of the two stars with respect to the image center as well as the equatorial coordinates of the image center, the orientation of the image and the pixel angular resolution of the image; and identify the two stars according to the star equatorial coordinates. The plate solving can be carried out by the solving program of the celestial-pole-position determining module 22 itself, and it can also be carried out by other devices coupled with the celestial-pole-position determining module 22 or by a solving server on the internet.

Figure 12:
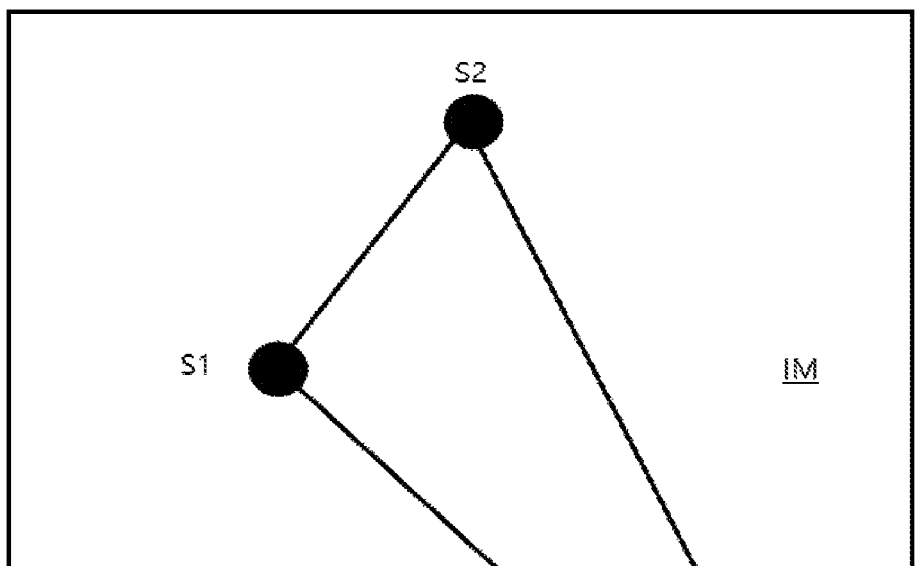
FIG. 12 is a schematic view showing the state where the celestial pole position is outside of the constellation image.

In addition, as already mentioned in the above description of the operation of determining the position of the rotation center of the polar axis, in actual use, it is possible to encounter the situation in which the celestial pole is not within the range of the constellation image. At this time, the polar axis calibration control device 20 can extend the coordinate system of the constellation image IM to a larger scope in the plane where this image lies in, and even to the entire plane where the constellation image lies in. In this way, the celestial pole position P2 can be recorded with coordinate values outside of the constellation image scope (see FIG. 12).

Atmospheric Refraction Correction of the Celestial Pole Position

Due to the atmospheric refraction (atmospheric refraction effect), the starry sky near the North Pole or the South Pole observed in a low latitude region has an actual angle lower than its true position, which would cause a certain constant error. The celestial-pole-position determining module 22 of the polar axis calibration system 100 according to the embodiment of present invention preferably further comprises an atmospheric refraction correcting module 22b.

Figure 13:
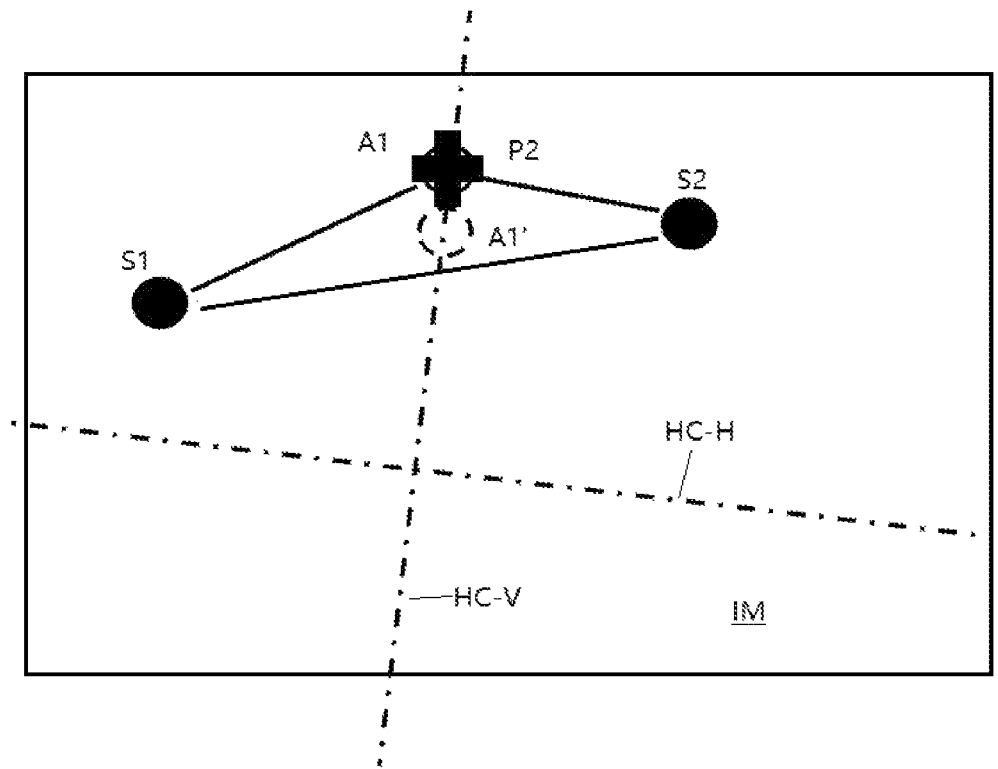
FIG. 13 is a schematic view of the atmospheric refraction correction method.
Figure 14:
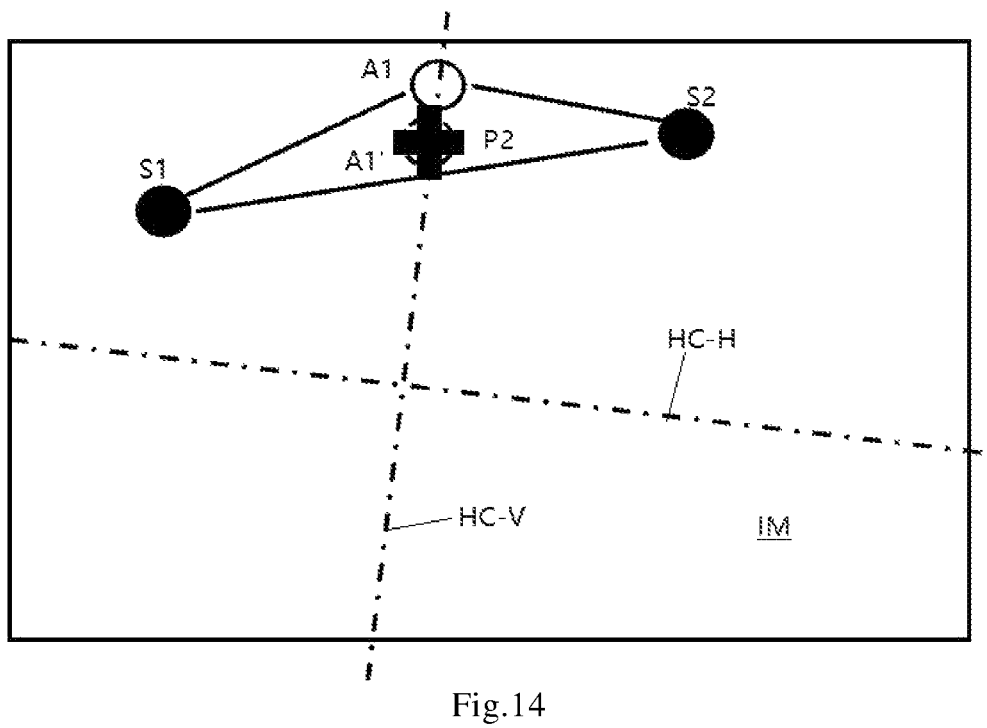
FIG. 14 is a schematic view of the atmospheric refraction correction result.

Referring to FIGS. 13 and 14, the atmospheric refraction correcting module 22b performs the following operations:

S51: obtaining correction amount for the atmospheric refraction according to the geographical latitude and empirical formula;

S52: determining the correction distance in the constellation images according to the image angular resolution of the constellation image, based on the correction amount for the atmospheric refraction;

S53: determining the height direction HC-V of the horizon system of coordinates in the constellation images; and S54: moving the celestial pole position by the correction distance along the height direction HC-V of the horizon system of coordinates in the plane of the constellation image to obtain a corrected celestial pole position. As shown in FIGS. 13 and 14, the celestial pole position P2 is moved from the originally calculated position A1 to the corrected position A1'.

The atmospheric refraction correcting module can determine the height direction HC-V of the horizon system of coordinates of the constellation image IM through one of the following manners:

a. obtaining the height direction of the horizon system of coordinates in the constellation image IM by means of the gravity direction value measured by the acceleration sensor in the measuring circuit 15 of the polar scope 10;

b. obtaining the orientation of the constellation images in the equatorial coordinate system by means of plate solving, then obtaining the angle of the equatorial coordinate system relative to the horizon system of coordinates according to the local time, and calculating the height direction of the horizon system of coordinates in the constellation images; and c. recording the height direction in the constellation image as the height direction of the horizon system of coordinates, when the polar axis 510 of the equatorial instrument rotates so as to bring the polar scope located on the equatorial instrument to rotate to a preset position where the image horizontal direction of the constellation images coincides with the horizon direction of the horizon system of coordinates.

In the above manner c, in order to facilitate finding the preset position where the image horizontal direction of the constellation image is caused to coincide with the horizontal direction HC-H of the horizon system of coordinates, as stated above, the polar scope 10 has an indication sign 17 provided on the outer surface of its telescope body 10a, and the indication sign 17 indicates the image horizontal direction or image height direction in the constellation images collected by the polar scope.

In the embodiment incorporated with the atmospheric refraction correcting module 22b, the celestial-pole-position determining module 22 outputs the above-mentioned corrected position (the position A1 as shown in FIG. 14) as the finally determined celestial pole position P2.

[Alignment of the Polar Axis]

The position P1 of the rotation center of the polar axis and the celestial pole position P2 determined by the polar axis calibration control device 22 can be displayed on the display device 30, as shown in FIG. 13.

The user can observe the position P1 of the rotation center of the polar axis and the celestial pole position P2 displayed on the display device 30 and then adjust the horizontal azimuth angle and elevation angle of the polar axis 510 of the equatorial instrument (for example, using the polar axis azimuth angle adjustment mechanism 520 and the elevation angle adjustment mechanism 530 on the equatorial instrument 500 as shown in FIG. 1), so as to cause the above-mentioned positions P1 and P2 coincide with each other and thereby achieve the polar axis calibration.

In a preferable embodiment, the polar axis calibration control device can further comprise a polar axis aligning module 23, which, based on the position P1 of the rotation center of the polar axis and the celestial pole position P2, calculates the azimuth angle adjustment amount and the elevation angle adjustment amount for the polar axis of the equatorial instrument that are required to bring the position of the rotation center of the polar axis into alignment with the celestial pole position. The azimuth angle adjustment amount and the elevation angle adjustment amount can be displayed on the display device 30.

More preferably, the polar axis calibration system 100 can further comprise an automatic polar axis alignment mechanism 40, as stated above. The automatic polar axis alignment mechanism 40 can be coupled with the polar axis calibration control device 20 in a wired or wireless manner, and can comprise a horizontal azimuth angle adjustment motor 41 for driving the equatorial instrument to rotate about its horizon axle and an elevation angle adjustment motor 42 for driving the pitch motion of the polar axis of the equatorial instrument, as shown in FIG. 2. The automatic polar axis alignment mechanism 40 receives the azimuth angle adjustment amount and the elevation angle adjustment amount from the polar axis calibration control device 20, and controls, based on this, the horizontal azimuth angle adjustment motor and the elevation angle adjustment motor. In this way, the automatic calibration of the polar axis can be advantageously achieved.

Optionally, the polar axis calibration control device 20 can further comprise a coarse adjustment module 24. The coarse adjustment module 24 can receive information about the geomagnetic azimuth angle and elevation angle obtained by the measuring circuit of the polar scope 10 for example before collecting the constellation images for polar axis calibration, and then according to local geographical latitude, calculate a coarse azimuth angle adjustment amount and a coarse elevation angle adjustment amount used for coarse adjustment of the polar axis. The coarse azimuth angle adjustment amount and the coarse elevation angle adjustment amount can be displayed on the display device 30 so as to assist the manual coarse adjustment of the polar axis. In addition or as an alternative, they can be transmitted to the automatic polar axis alignment mechanism to perform the coarse adjustment automatically.

The automatic polar axis alignment mechanism can further comprise other hardware (for example, controller etc.) and/or software program besides the electrical motors, and the present invention is not limited in this respect.

In order to facilitate understanding the whole operation of polar axis calibration performed using the polar axis calibration system 100 of the present invention, one example of the operation of polar axis calibration is given below by way of example only, which comprises the following steps:

S61: collecting images of constellation images in proximity to the celestial pole and displaying the images;

S62: identifying the stars in the collected constellation images, and obtaining position coordinates of the stars in the constellation image;

S63: calculating the celestial pole position and then marking the coordinates of this position in the constellation image, based on the above-mentioned positions of the stars as well as the relative positional relationship among the stars and the celestial pole;

S64: rotating the polar axis of the equatorial instrument, collecting constellation images at three different rotation positions, and finding a same star in the constellation images, obtaining the coordinates of said star at the three positions in the constellation image, thereby determining the position of the rotation center of the polar axis of the equatorial instrument, then displaying the position of the rotation center of the polar axis in the constellation image; and S65: adjusting the horizontal azimuth angle and elevation angle of the polar axis, so that the position of the rotation center of the polar axis is in alignment with the celestial pole position, thereby achieving the calibration of the polar axis.

The above polar axis calibration steps are merely exemplary. For example, the determination of the celestial pole position and the determination of the position of the rotation center of the polar axis can be changed in their order. In addition, it will be understood that the image collection may be carried out multiple times in several steps or in one step. Accordingly, the present invention is not limited to specific contents or order of the various steps of the above-described operation.

According to other embodiments of the present invention, a polar scope for the above-mentioned system, a calibration control device used for the polar axis of the equatorial instrument, an equatorial instrument comprising the polar axis calibration system, the polar scope, or the polar axis calibration control device, and an astronomical telescope comprising the polar scope, the polar axis calibration system or the equatorial instrument are provided, and detailed description thereof is omitted herein for the sake of clarity and conciseness.

It should be noted that although the operation of the method is described in a particular order in the drawings, this does not require or imply that the operations must be performed in that particular order, or that all of the operations shown must be performed in order to achieve the desired result. In contrast, the steps depicted in the flowchart can change their execution order. Additionally or alternatively, certain steps can be omitted, a plurality of steps can be combined into one step, and/or a step can be decomposed into a plurality of steps.

The foregoing description is only a advantageous embodiment of the present application and a description of the technical principles of the application. It should be understood by those skilled in the art that the scope of the invention recited in this application is not limited to the technical solutions formed by the specific combination of the above-described technical features, and should also encompass other technical solutions formed by any combination of the above technical features or their equipollent features. For example, the technical solutions can be those formed through the mutual substitution between the above-mentioned features and the technical features disclosed in the present application (but not limited thereto) having similar functions.

What is claimed is:

1. A polar axis calibration system for an equatorial instrument, the equatorial instrument having a polar axis, the polar axis calibration system comprising:
    a polar scope, comprising an optical lens and an image sensor for collecting constellation images; and
    a polar axis calibration control device, for receiving the constellation images from the polar scope and determining the position of the rotation center of the polar axis and the celestial pole position based on the constellation images, wherein the position of the rotation center of the polar axis means the position of the rotation center of the polar axis of the equatorial instrument in the plane of the constellation images, and the celestial pole position means the position of the celestial pole in the plane of the constellation images.

2. The polar axis calibration system according to claim 1, wherein the polar axis calibration control device comprises a rotation-center-of-the-polar-axis determining module, which determines the position of the rotation center of the polar axis through the following operations:
    obtaining three constellation images collected by the polar scope when the polar scope is rotated to three different positions along with the polar axis of the equatorial instrument;
    finding a same star in the three constellation images;
    obtaining three position coordinates of the same star in the three constellation images; and
    calculating the position of the rotation center of the polar axis based on the three position coordinates.

3. The polar axis calibration system according to claim 1, wherein the polar axis calibration control device comprises a celestial-pole-position determining module, which determines the celestial pole position through the following operations:

obtaining the constellation images collected by the polar scope;

identifying three stars in the constellation images;

obtaining the star position coordinates of the three stars in the constellation images; and determining the celestial pole position based on the star position coordinates and the relative positional relationship among the three stars and the celestial pole.

4. The polar axis calibration system according to claim 3, wherein the polar axis calibration control device receives star identification information from the operator via an user interface, and the celestial-pole-position determining module identifies three stars in the constellation images based on said star identification information.

5. The polar axis calibration system according to claim 3, wherein the celestial-pole-position determining module comprises a mask identifying module for identifying three stars from the constellation images by means of a star mask, and the star mask has at least three star zones corresponding to the positions of at least three stars in proximity to the celestial pole respectively, wherein the mask identifying module identifies three stars through the following operations:

fitting the star mask into the constellation images;

moving the star mask so as to bring at least three of the star zones in the star mask into alignment with at least three stars in the constellation images; and identifying three stars according to three of said at least three star zones that are brought into alignment.

6. The polar axis calibration system according to claim 5, wherein one of the at least three star zones in the star mask is a characteristic-star star zone corresponding to one star in proximity to the celestial pole; and during the operation of moving the star mask so as to bring at least three of the star zones into alignment with at least three stars in the constellation images, the mask identifying module firstly brings the characteristic-star star zone into alignment with the characteristic star in the constellation images, then rotates the star mask around the characteristic-star star zone to bring other star zones into alignment with other stars in the constellation images.

7. The polar axis calibration system according to claim 3, wherein the celestial-pole-position determining module comprises an atmospheric refraction correcting module, which performs the following operations:

obtaining correction amount for the atmospheric refraction according to the geographical latitude and empirical formula;

determining the correction distance in the constellation images according to the image angular resolution of the constellation image, based on the correction amount for the atmospheric refraction;

determining the height direction of the horizon system of coordinates in the constellation images; and moving the celestial pole position by the correction distance along the height direction of the horizon system of coordinates in the plane of the constellation image, to obtain a corrected celestial pole position.

8. The polar axis calibration system according to claim 7, wherein the atmospheric refraction correcting module determines the height direction of the horizon system of coordinates of the constellation image through one of the following manners:

a. obtaining the height direction of the horizon system of coordinates of the images utilizing a gravity direction measured by an acceleration sensor of the polar scope, wherein the acceleration sensor is use to measure the gravity direction of the polar scope and is coupled to the polar axis calibration control device;

b. making a plate solving to obtain the orientation of the constellation images in the equatorial coordinate system, then obtaining the angle of the equatorial coordinate system relative to the horizon system of coordinates according to the local time, and calculating the height direction of the horizon system of coordinates in the constellation images; and c. when the polar axis of the equatorial instrument rotates so as to bring the polar scope located on the equatorial instrument to rotate to a preset position where the image horizontal direction of the constellation images coincides with the horizon direction, recording the height direction in the constellation image as the height direction of the horizon system of coordinates.

9. The polar axis calibration system according to claim 1, wherein the polar axis control device comprises a celestial-pole-position determining module, which determines the celestial pole position through the following operations:

obtaining the constellation images collected by the polar scope;

identifying two stars from the constellation images;

obtaining the star position coordinates of the two stars in the constellation images; and determining the celestial pole position based on the star position coordinate, the positional relationship among the two stars and the celestial pole, and a deviation direction of the constellation image with respect to the celestial pole.

10. The polar axis calibration system according to claim 1, wherein the polar axis calibration control device further comprises a polar axis aligning module, and based on the celestial pole position and the position of the rotation center of the polar axis, the polar axis aligning module calculates the azimuth angle adjustment amount and the elevation angle adjustment amount for the polar axis of the equatorial instrument that are required to bring the position of the rotation center of the polar axis into alignment with the celestial pole position.

11. The polar axis calibration system according to claim 10, further comprising an automatic polar axis alignment mechanism, wherein the automatic polar axis alignment mechanism is coupled to the polar axis calibration control device, and comprises a horizontal azimuth angle adjustment motor that drives the equatorial instrument to rotate about its horizon axis and an elevation angle adjustment motor that drives the pitch motion of the polar axis of the equatorial instrument; and the automatic polar axis alignment mechanism receives the azimuth angle adjustment amount and the elevation angle adjustment amount from the polar axis aligning module, and based on this, controls the horizontal azimuth angle adjustment motor and the elevation angle adjustment motor.

12. An astronomical telescope comprising the polar axis calibration system according to claim 1.

13. A polar axis calibration control device for an equatorial instrument, the equatorial instrument comprising a polar axis, wherein the polar axis calibration control device receives constellation images from a polar scope, which is mounted on the equatorial instrument and rotates along with the polar axis, and determines the position of the rotation center of the polar axis and the celestial pole position based on the constellation images, the position of the rotation center of the polar axis means the position of the rotation center of the polar axis of the equatorial instrument in the plane of the constellation image, and the celestial pole position means the position of the celestial pole in the plane of the constellation image, the polar axis calibration control device comprises:
a rotation-center-of-the-polar-axis determining module, which determines the position of the rotation center of the polar axis through the following operations:
obtaining three constellation images collected by the polar scope when the polar scope is rotated to three different positions along with the polar axis of the equatorial instrument;
finding a same star in the three constellation images;
obtaining three position coordinates of the same star in the three constellation images; and
calculating the position of the rotation center of the polar axis based on the three position coordinates, and
a celestial-pole-position determining module, which determines the celestial pole position through the following operations;
obtaining the constellation images collected by the polar scope;
identifying at least two stars in the constellation images;
obtaining the star position coordinates of the at least two stars in the constellation images; and
determining the celestial pole position based on the star position coordinates and the relative positional relationship among the stars and the celestial pole.

14. The polar axis calibration control device according to claim 13, wherein
the celestial-pole-position determining module comprises a mask identifying module for identifying three stars from the constellation images by means of a star mask, and the star mask has at least three star zones, which are corresponding to the positions of at least three stars in proximity to the celestial pole respectively, wherein the mask identifying module identifies three stars through the following operations:

fitting the star mask into the constellation images;
moving the star mask so as to bring the at least three star zones in the star mask into alignment with at least three stars in the constellation images; and
identifying three stars according to three of the at least three star zones that are brought into alignment.

15. The polar axis calibration control device according to claim 13, wherein the celestial-pole-position determining module comprises an atmospheric refraction correcting module, which performs the following operations:

obtaining correction amount for the atmospheric refraction according to the geographical latitude and empirical formula;
determining the correction distance in the constellation images according to the image angular resolution of the constellation images, based on the correction amount for the atmospheric refraction;
determining the height direction of the horizon system of coordinates in the constellation images; and
moving the celestial pole position by the correction distance along the height direction of the horizon system of coordinates in the plane of the constellation image to obtain a corrected celestial pole position.

16. The polar axis calibration control device according to claim 13, further comprising a polar axis aligning module, wherein based on the celestial pole position and the position of the rotation center of the polar axis, the polar axis aligning module calculates the azimuth angle adjustment amount and the elevation angle adjustment amount for the polar axis of the equatorial instrument required to bring the position of the rotation center of the polar axis into alignment with the celestial Dole position.

* * * * *